United States Patent [19]

Jikihara

[11] Patent Number: 4,703,671
[45] Date of Patent: Nov. 3, 1987

[54] DIFFERENTAL LOCKING MECHANISM FOR A FINAL REDUCTION GEAR

[75] Inventor: Yoshiro Jikihara, Aichi, Japan

[73] Assignee: Toyota Jidosha Kabushiki Kaisha, Aichi, Japan

[21] Appl. No.: 823,191

[22] Filed: Jan. 29, 1986

[30] Foreign Application Priority Data

Feb. 14, 1985 [JP] Japan ................................. 60-21167

[51] Int. Cl.$^4$ ............................................. F16H 1/44
[52] U.S. Cl. ..................................... 74/710.5; 74/607; 74/711
[58] Field of Search ....................... 74/710.5, 711, 607

[56] References Cited

U.S. PATENT DOCUMENTS

| | | | |
|---|---|---|---|
| 2,876,658 | 3/1959 | McColl | 74/710.5 |
| 3,195,371 | 7/1965 | Christie | 74/710.5 X |
| 4,113,044 | 9/1978 | Williams et al. | 74/710.5 X |
| 4,462,271 | 7/1984 | Stieg | 74/710.5 X |

FOREIGN PATENT DOCUMENTS

| | | | |
|---|---|---|---|
| 5521264 | 7/1976 | Japan . | |
| 55171636 | 5/1977 | Japan . | |
| 162334 | 12/1979 | Japan | 74/710.5 |
| 5889427 | 12/1981 | Japan . | |
| 11119 | 1/1982 | Japan | 74/710.5 |
| 137648 | 8/1984 | Japan | 74/710.5 |

Primary Examiner—Leslie Braun
Assistant Examiner—Dwight G. Diehl
Attorney, Agent, or Firm—Parkhurst & Oliff

[57] ABSTRACT

A differential locking mechanism for a final reduction gear is disclosed. Sleeve-like shaft support portions are formed fixedly at both sides of a differential case in a differential carrier and rotatably supported by the differential carrier. Rotating side gear shafts are connected to the side gears in the differential case and extend through the shaft support portions of the differential case to the outside of the differential carrier. The locking mechanism has a case independent of the differential carrier fixed to the outer side portion of the differential carrier to define an auxiliary chamber. A cylindrical intermediate shaft is mounted to an outer circumference of the rotating side gear shaft on the auxiliary chamber side in such a manner as to be coaxial with the rotating side gear shaft. One end of the intermediate shaft is connected to an inner circumference of the shaft support portion of the differential case so as to rotate therewith, while the other end is positioned in the auxiliary chamber. A clutch mechanism is provided in the auxiliary chamber for locking and unlocking differential rotation between the intermediate shaft and the side gear shaft.

13 Claims, 4 Drawing Figures

DIFFERENTAL LOCKING MECHANISM FOR A FINAL REDUCTION GEAR

BACKGROUND OF THE INVENTION

The present invention relates to a differential locking mechanism for locking (preventing) differential action in a final reduction gear of a vehicle.

In a conventional differential locking mechanism, a differential case rotating in a differential carrier and rotating shafts for transmitting rotation to right and left driving wheels (axle shafts or side gear shafts) are designed to be locked so as not to rotate relative to each other by using a spline type clutch means or a dog clutch means (see, for example, Japanese Utility Model Laid-Open Publications Nos. 58-89427 and 55-21264). The differential action is locked by preventing the differential case and the side gear shafts from rotating at different speeds. Further, a diaphragm device operated by engine intake manifold vacuum has been proposed as a means for providing the operating force for the differential locking mechanism (see Japanese Utility Model Laid-Open Publication No. 55-171636).

FIG. 4 shows an exemplary structure of a conventional differential locking mechanism. As shown in FIG. 4, each member constituting the differential locking mechanism is installed in a space 34 defined between a partition wall 36 and a side wall 1a of the differential carrier 1. Sleeve-like shaft support portions 2a, 2b integrally formed with or fixed on both sides of a differential case 2 are supported rotatably by the carrier 1 by side bearings 3, 3a in the differential carrier 1. The side bearing 3a (on right-hand side in FIG. 4) is faced by the partition wall 36.

The shaft support portion 2b extends from a bearing portion supported by the right side bearing 3a into the space 34. A spline piece 32 having external spline teeth 32a engages an outer circumference of the shaft support portion 2b in the space 34 so as to rotate with the shaft support portion 2b. The right side gear shaft 9 is formed integrally with a clutch hub 30 having external spline teeth 30a meshed with internal spline teeth 31a of a hub sleeve 31.

The sleeve 31 is formed with a groove for engagement with a fork 33. The fork 33 is fixed to a rod 35. Accordingly, when the rod 35 is moved to the left in FIG. 4, the sleeve 31 also is moved to the left by the fork 33. When the hub sleeve 31 is located in the position shown in FIG. 4, the internal spline teeth 31a mesh only with the external spline teeth 30a of the clutch hub 30, so that the side gear shaft 9 and differential case 2 can rotate at different speeds. Thus, differential action is allowed in this condition. However, when the hub sleeve 31 slides further to the left, the internal spline teeth 31a mesh not only with the external spline teeth 31a of the clutch hub 30, but also with the external spline teeth 32a of the spline piece 32. In this position, the side gear shaft 9 and differential case 2 are prevented from rotating at different speeds, so that the differential action is locked.

The above-mentioned conventional differential limiting mechanism has the following defects:

(1) As all the components of the differential limiting mechanism, that is, the clutch hub 30, hub sleeve 31, spline piece 32, fork 33, etc., are installed in the space 34 of the differential carrier 1, the differential carrier 1 itself must be rather large, and have a shape different from that of a conventional carrier, requiring a new die for molding the carrier 1 and a machining line therefor.

(2) As the shaft support portion 2b of the differential case 2 extends into the space 34, the rear opening portion of the carrier 1 for installing the differential case 2 into the differential carrier 1 must be enlarged, reducing the rigidity of the rear opening portion of the carrier 1 and the sealability between the carrier 1 and a rear cover (not shown).

(3) As the spline piece 32 is connected to the outer circumference of the extended portion of the shaft support portion 2b, a through-hole 36a must be formed to allow for installation of the spline piece 32 through the partition wall 36 separating the differential carrier 1 from the space 34, which reduces the axial support rigidity of the side bearing 3a. Further, upon installing the differential case 2 into the carrier 1, a preload adjusting shim 24 interposed between an outer race of the side bearing 3a and the partition wall 36 must be installed preliminarily at an outer circumference of the extended portion of the shaft support portion 2b, which makes installation of the shim 24 difficult.

(4) If a higher strength differential locking mechanism is required, it is necessary to mold a differential carrier 1 having a larger capacity for the sole purpose of meeting such requirement.

SUMMARY OF THE INVENTION

It is an object of the present invention to provide a differential locking mechanism for a final reduction gear for a vehicle which allows use of a differential carrier used with a conventional carrier, thereby eliminating any need for a special die for molding the differential carrier and a special machining line.

It is another object of the present invention to provide a differential locking mechanism for a final reduction gear which has no influence on the installation or support rigidity of the side bearings in the differential carrier and the preload adjusting shim.

It is a further object of the present invention to provide a differential locking mechanism for a final reduction gear, the strength or capacity of the differential limiting mechanism of which can be increased simply by modifying the clutch means, without modifying the differential carrier itself.

According to the present invention, a final reduction gear includes sleeve-like shaft support portions fixedly formed at both sides of a differential case in a differential carrier and rotatably supported by the differential carrier. Rotating side gear shafts are connected to both side gears in the differential case and extend through the shaft support portions of the differential case to the outside of the differential carrier. A case independent of the differential carrier is fixed to the outer side portion of the differential carrier to define an auxiliary chamber for the differential locking mechanism. A cylindrical intermediate shaft is mounted to an outer circumference of the rotating side gear shaft on the auxiliary chamber side in such a manner as to be coaxial with the rotating side gear shaft. One end of the intermediate shaft is connected to an inner circumference of the shaft support portion of the differential case so as to prevent the intermediate shaft from rotating at a different speed from the differential case. The other end is positioned in the auxiliary chamber. A clutch means also is provided in the auxiliary chamber for locking or unlocking differential rotation between the intermediate shaft and the side gear shaft.

DETAILED DESCRIPTION OF THE PREFERRED EMBODIMENT

Figure 1:
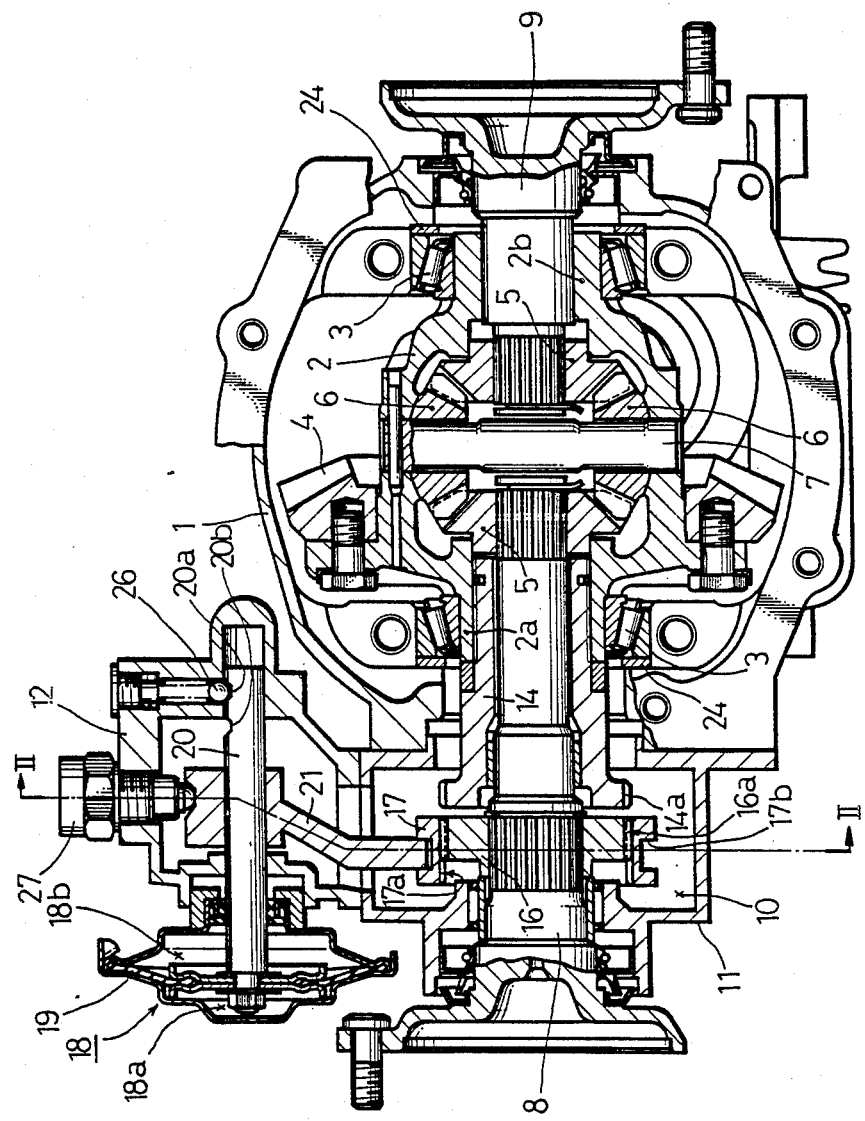
FIG. 1 is a sectional review of a preferred embodiment of a final reduction gear having a differential locking mechanism according to the present invention.

Referring now to FIG. 1, sleeve-like shaft portions 2a, 2b are formed on both sides of a differential case 2 so as not to rotate relative to each other or the case 2, and are mounted for rotation relative to a differential carrier 1 by side bearings 3. A ring gear 4 is fixed to an outer periphery of the differential case 2. The ring gear 4 normally meshes with a drive pinion (not shown) so as to be driven rotationally by an engine. A pair of side gears 5 and a pair of pinions 6 meshed with the side gears 5 are incorporated in the differential case 2. Each side gear is engaged by splines with a respective side gear shaft (rotary shaft) 8, 9 arranged on the rotary axis of the differential case 2 so that rotation may be transmitted from the side gears 5 to the side gear shafts 8, 9. The side gear shafts 8, 9 extend through the axial portion of the respective shaft support portions 2a, 2b to the outside of the differential carrier 1, so as to transmit rotation through universal joints (not shown) and axle shafts (not shown) to drive wheels (not shown). A pinion shaft 7 is supported by the differential case 2 at both ends thereof, and the pinions 6 are rotatably supported by the pinion shaft 7.

Figure 2:
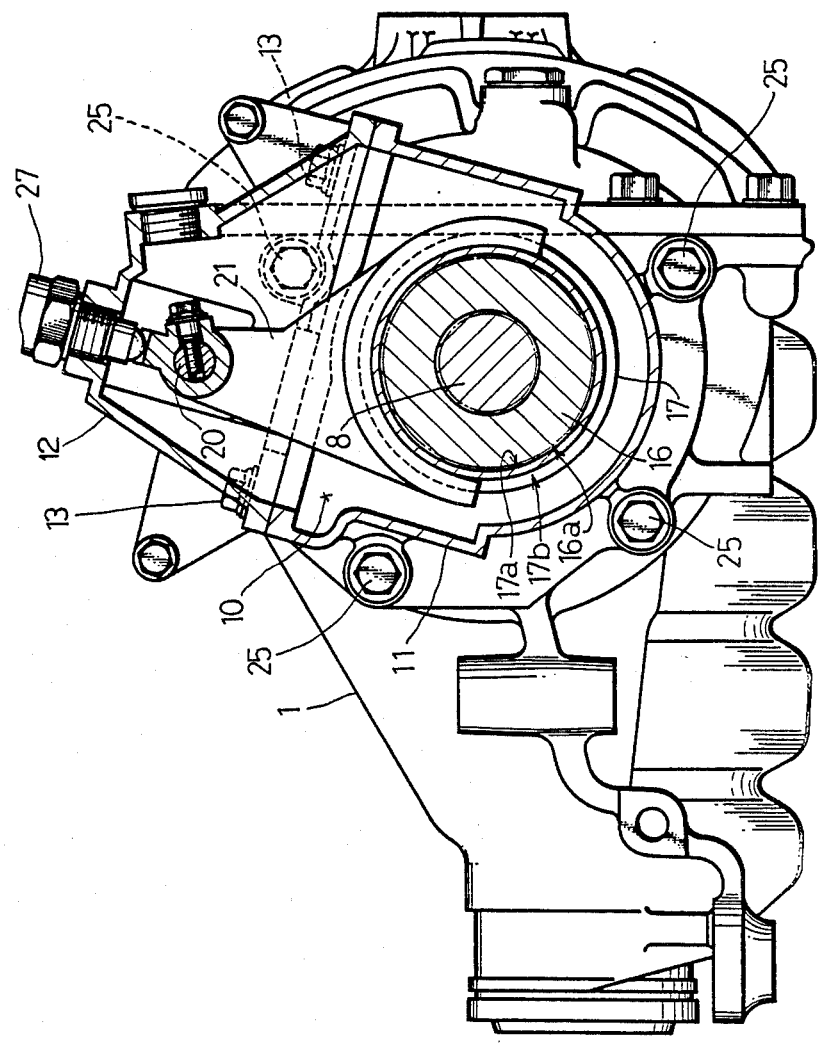
FIG. 2 is a cross section taken along the line II—II in FIG. 1.

Referring to FIGS. 1 and 2, a case 11 formed independently of the carrier 1 is fixed to a left side portion of the differential carrier 1 by a plurality of bolts 25, so as to define an auxiliary chamber 10 for a differential limiting mechanism. A sleeve-like intermediate selective adaptor shaft 14 is mounted to an outer circumference of the side gear shaft 8 on the auxiliary chamber 10 side in such a manner as to be arranged coaxially with the side gear shaft 8. One end of the intermediate shaft 14 has splines meshing with splines on an inner circumference of the shaft support portion 2a of the differential case 2, so as to rotate in an integral manner therewith. The other end of the intermediate shaft 14 is an adaptor end positioned in the auxiliary chamber 10, and has external spline teeth 14a formed on an outer circumference thereof. A clutch hub 16 is mounted to the outer circumference of the side gear shaft 8 in the auxiliary chamber 10 so that the clutch hub 16 is integrally rotatable with the side gear shaft 8. Internal spline teeth 17a of a clutch hub sleeve 17 engage external spline teeth 16a formed on the outer circumference of the clutch hub 16 in such a manner as to be slidable to the right from the position shown in FIG. 1. In other words, the external spline teeth 14a of the intermediate shaft 14, the clutch hub 16 and the clutch sleeve 17 together comprise a clutch means for the differential locking mechanism.

A case cover 12 is fixed at an upper opening portion of the case 11 of the auxiliary chamber 10 by a plurality of bolts 13. As shown in FIG. 1, a diaphragm device 18 is provided on an outer side portion of the case cover 12. A rod 20 connected at its one end to a diaphragm 19 in the diaphragm device 18 is axially slidably inserted into the case cover 12. A fork 21 is fixed to the rod 20 in the case cover 12, that is, in the auxiliary chamber 10. The fork 21 engages an annular groove 17b formed on the outer circumference of the clutch hub sleeve 17.

The diaphragm device 18 is separated into two chambers 18a, 18b by the diaphragm 19, and engine intake manifold vacuum and atmospheric pressure alternatively and selectively are supplied through pipes (not shown) to the chambers 18a, 18b. In other words, engine intake manifold vacuum is applied to one of the chambers 18a, 18b, while atmospheric pressure is applied to the other. Selective application of the vacuum is effected by a selector means, e.g., valves (not shown). Reference numeral 26 in FIG. 1 designates a detent ball for restricting a slide position of the rod 20 in association with operation of the diaphragm 19 of the diaphragm device 18 and detent recesses 20a, 20b formed in the rod 20. Reference numeral 27 in FIGS. 1 and 2 designates an indicator switch to be switched on and off by operations of the fork 21 and the rod 20.

In the above-described differential limiting mechanism for a final reduction device, when engine intake manifold vacuum is applied to chamber 18a and atmospheric pressure to chamber 18b, the rod 20 slides to the left, detent recess 20a engages the detent ball 26, and the fork 21 and clutch hub sleeve 17 are located in the position shown in FIG. 1. If pressure in the diaphragm chambers 18a, 18b then is equalized, e.g., if chamber 18a is allowed to return to atmospheric pressure, the detent engagement will hold the rod 20 in position.

In this position, the side gear shaft 8 can rotate independently of the intermediate shaft 14 and the differential case 2. Therefore, if rotational loads to the side gear shafts 8, 9 are different from each other, differential action is effected by rotation of pinion gears 6 to make the rotation speeds of the side gear shafts 8, 9 different.

When such differential action of the final reduction gear must be locked, the engine intake manifold vacuum and the atmospheric pressure applied to the chambers 18a, 18b are reversed. That is, the engine intake manifold vacuum is applied to chamber 18b, where the atmospheric pressure had been applied, while the atmospheric pressure is applied to chamber 18a, where the engine intake manifold vacuum had been applied. As a result, the diaphragm 19 pushes the rod 20 to the right from the position shown in FIG. 1, and the clutch hub sleeve 17 also is moved to the right as seen in FIG. 1 by the fork 21 connected to the rod 20. As a result, the internal spline teeth 17a of the clutch hub sleeve 17 mesh with the external spline teeth 14a of the intermediate shaft 14, while staying meshed with the external spline teeth 16a of the clutch hub 16. Accordingly, the differential case 2 and the side gear shaft 8 are inhibited from relative rotation through the clutch hub 16, the clutch hub sleeve 17 and the intermediate shaft 14, thereby locking the differential action of the final reduction gear. When the final reduction gear is switched to the differential action limiting condition, the indicator switch 27 is switched from an off state to an on state, for example, by operation of the fork 21, thereby turning on an indicator lamp or the like in a passenger compartment. Also, the detent ball 26 will engage detent recess 20b, holding the rod 20 in position even if pressure is equalized in chambers 18a, 18b.

Figure 4:
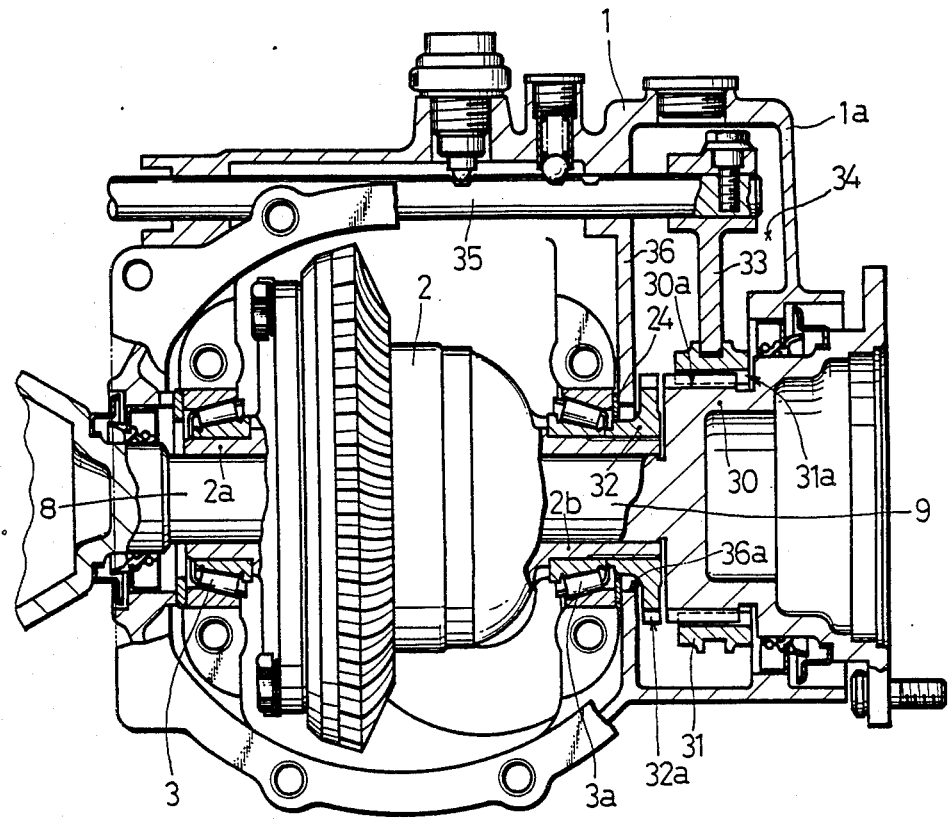
FIG. 4 is a sectional view of a prior art final reduction gear having a differential locking mechanism.

As mentioned above, in the preferred embodiment the auxiliary chamber 10 is formed by the case 11 (inclusive of the case cover 12) independent of the differential carrier 1 at the outer side portion thereof, and the auxiliary chamber 10 incorporates therein the differential action locking mechanism comprised of the clutch hub 16, the clutch hub sleeve 17, a part of the intermediate shaft 14 and the fork 21. Therefore, the presence of the differential locking mechanism has no influence upon the shape or volume of the differential carrier 1, thereby permitting use of an existing conventional carrier. Further, as compared with the prior art device shown in FIG. 4, it is unnecessary to extend the shaft support portions 2a and 2b of the differential case 2, thereby similarly avoiding modification of the shape of the differential carrier 1 (enlargement of the rear opening of the carrier 1, for example).

Since the intermediate selective adaptor shaft 14 is connected by splines with the inner circumference of the shaft support portion 2a of the differential case 2, it is unnecessary to modify the shape of the side bearing 3 supporting the outer circumference of the shaft support portion 2a or the shape of the carrier 1 supporting the outer race of the side bearing 3. Proper supporting rigidity in the axial direction of the side bearing 3 thereby is maintained. Further, the preload adjusting shim 24 of each side bearing 3 can be installed in the same manner as with the conventional carrier. Additionally, when the differential locking mechanism must have high strength, e.g., is for a large capacity vehicle, the necessary changes can be made simply by modifying a part of the intermediate selective adaptor shaft 14 positioned in the auxiliary chamber 10, the clutch hub 16 and the clutch hub sleeve 17, without modifying the differential carrier 1 itself.

Figure 3:
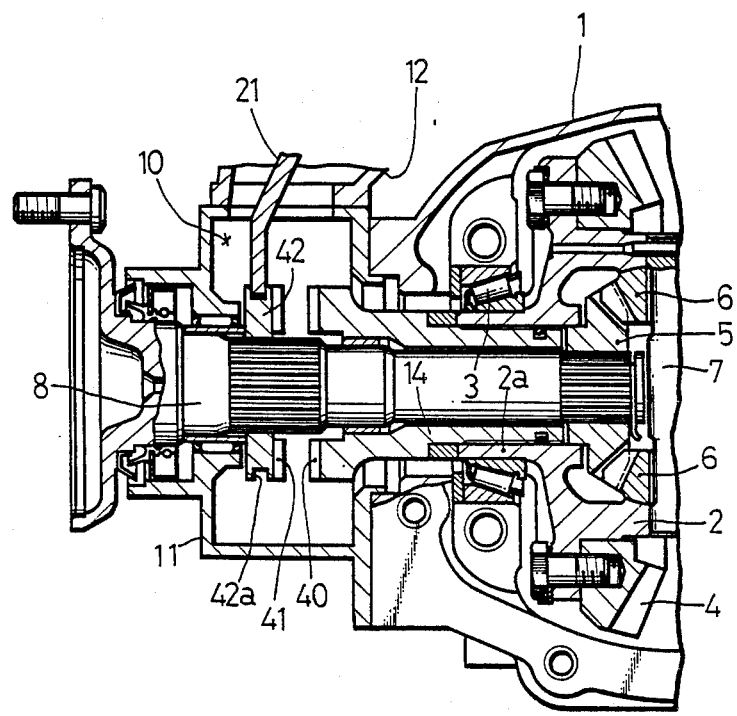
FIG. 3 is a partial sectional view similar to FIG. 1 of another preferred embodiment according to the present invention.

FIG. 3 shows another embodiment according to the present invention employing a dog type clutch means instead of a spline type clutch means (comprising the clutch hub 16 and the clutch hub sleeve 17, etc., of the first embodiment). Parts of this embodiment which are identical or similar to corresponding parts of the first embodiment are designated by identical reference numbers as those used with the first embodiment in FIGS. 1 and 2, and further explanation thereof is omitted.

In this embodiment, the intermediate shaft 14 in the auxiliary chamber 10 is formed with a dog clutch tooth 40 at the end thereof in substitution for the external spline teeth 14a of the previous embodiment. An operating member 42 having a dog clutch tooth 41 adapted to mesh with the dog clutch tooth 40 of the intermediate shaft 14 is axially slidably engaged with an outer circumference of the side gear shaft 8 by spline. An annular groove 42a formed at an outer circumference of the operating member 42 is engaged with the fork 21. When the operating member 42 is moved to the right in FIG. 3 through operation of the fork 21, the dog clutch tooth 41 meshes with the dog clutch tooth 40 of the intermediate shaft 14, thereby locking the differential action of the final reduction gear in the same manner as in the previous embodiment.

Having thus described the preferred embodiments of the invention, it should be understood that numerous structural modifications and adaptations may be resorted to by one of ordinary skill in the art without departing from the spirit of the invention, and the scope of the appended claims. For example, the clutch sleeve 17 has been depicted as normally engaging the clutch hub 16 and only selectively engage the intermediate shaft 14. However, substantially the same effects and benefits could be achieved if the clutch sleeve 17 normally engaged the intermediate shaft 14 and only selectively engaged the clutch hub 16.

What is claimed is:

1. In a final reduction gear having:
   a differential carrier;
   a differential case containing a pair of side gears and a pair of pinion gears;
   a pair of sleeve-like shaft support portions formed fixedly at both sides of the differential case in the differential carrier, said differential case being rotatably mounted in the differential carrier by said support portions; and
   a pair of rotating side gear shafts, each connected to one of said side gears in the differential case and extending through the shaft support portions of the differential case to the outside of the differential carrier;
   a differential locking mechanism comprising:
   a case independent of the differential carrier fixed to an outer side portion of the differential carrier and defining an auxiliary chamber;
   a cylindrical intermediate selective adaptor shaft rotatably mounted on an outer circumference of a first of the rotating side gear shafts, in such a manner as to be coaxial with said first rotating side gear shaft, one end of said intermediate selective adaptor shaft being connected to an inner circumference of the shaft support portion of the differential case so as to rotate integrally therewith and an opposite adaptor end of said intermediate selective adaptor shaft being positioned in the auxiliary chamber; and
   clutch means provided in the auxiliary chamber to engage said adaptor end of said intermediate selective adaptor shaft for selectively locking and unlocking differential rotation between said differential case and said first side gear shaft whereby the selective adaptor shaft may be exchanged for a second adapter shaft having a modified adaptor end, without requiring further modification of the differential.

2. The differential locking mechanism according to claim 1, wherein said clutch means comprises:
   external spline teeth formed on a circumference of said intermediate shaft near said other end thereof;
   a clutch hub provided on said first side gear shaft for rotation therewith adjacent to said intermediate shaft, said clutch hub having external spline teeth formed thereon substantially coaxial with said external spline teeth of said intermediate shaft;
   a clutch sleeve axially slidably disposed outside said clutch hub and having internal spline teeth formed thereon for selective engagement with a first set of external spline teeth selected from the group consisting of said external spline teeth of said intermediate shaft and said external spline teeth of said clutch hub; and
   means for axially sliding said clutch sleeve to selectively engage and disengage said first set of external spline teeth.

3. The differential locking mechanism according to claim 2, wherein said internal spline teeth of said clutch sleeve always engage said external teeth of said clutch hub and selectively engage said external teeth of said intermediate shaft.

4. The differential locking mechanism according to claim 2, wherein said clutch means further comprises:
   an annular groove formed in an outer surface of said clutch sleeve;
   an axially movable fork rotatably supporting said clutch sleeve at said annular groove, said internal spline teeth of said clutch sleeve being selectively engaged and disengaged by movement of an fork in the axial direction of the sleeve.

5. The differential locking mechanism according to claim 4, wherein said clutch means further compries:
   diaphragm means for moving said fork by action of engine intake manifold vacuum.

6. The differential locking mechanism according to claim 5, wherein said diaphragm means comprises:
   a diaphragm chamber;
   a diaphragm in said diaphragm chamber separating said chamber into two portions; and
   an axially slidable rod connected to said diaphragm and extending outside of said diaphragm chamber, said fork being mounted to said rod.

7. The differential locking mechanism according to claim 6, further comprising:
   at least two detent recesses formed in said rod; and
   a detent ball mounted in said independent case for engagement with said detent recesses to hold said rod in a selected position when pressures in both portions of said diaphragm chamber are equalized.

8. The differential locking mechanism according to claim 1, wherein said clutch means further comprises:
   a dog clutch tooth formed on said other end of said intermediate shaft;
   an axially movable sleeve-like operating member provided on said first side gear shaft for rotation therewith adjacent to said intermediate shaft, said operating member having a dog clutch tooth engageable with said dog clutch tooth of said intermediate shaft; and
   means for axially moving said operating member selectively to engage and disengage said dog clutch teeth.

9. The differential locking mechanism according to claim 8, wherein said clutch means further comprises:
   an annular groove formed in an outer surface of said operating member;
   an axially movable fork rotatably supporting said operating member at said annular groove, said dog teeth being engaged and released by movement of the fork in the axial direction of the operating member.

10. The differential locking mechanism according to claim 9, wherein said clutch means further comprises diaphragm means for moving said fork by action of the engine intake manifold vacuum.

11. The differential locking mechanism according to claim 10, wherein said diaphragm means comprises:
    a diaphragm chamber;
    a diaphragm in said diaphragm chamber separating said chamber into two portions; and
    an axially slidable rod connected to said diaphragm and extending outside of said diaphragm chamber, said fork being mounted to said rod.

12. The differntial locking mechanism according to claim 11, further comprising:
    at least two detent recesses formed in said rod; and
    a detent ball mounted in said independent case for engagement with said detent recesses to hold said rod in a selected position when pressures in both portions of said diaphragm chamber are equalized.

13. The differential locking mechanism according to claim 1, further comprising engagement sensor means for determining whether said clutch means is engaged and generating a signal representative thereof.

* * * * *